(12) United States Patent
Dressler et al.

(10) Patent No.: US 8,187,663 B2
(45) Date of Patent: May 29, 2012

(54) MEASUREMENT, MONITORING AND CONTROL OF DIRECTED PRODUCT MOVEMENTS IN A WURSTER-ARRANGEMENT AND SUITABLE SYSTEMS

(75) Inventors: Jochen A. Dressler, Mietingen (DE); Manfred Struschka, Auggen (DE); Bernhard Luy, Sulzburg (DE)

(73) Assignee: Glatt GmbH, Binzen (DE)

( * ) Notice: Subject to any disclaimer, the term of this patent is extended or adjusted under 35 U.S.C. 154(b) by 904 days.

(21) Appl. No.: 12/162,674

(22) PCT Filed: Jan. 23, 2007

(86) PCT No.: PCT/EP2007/000544
§ 371 (c)(1), (2), (4) Date: Jul. 30, 2008

(87) PCT Pub. No.: WO2007/090515
PCT Pub. Date: Aug. 16, 2007

(65) Prior Publication Data
US 2009/0011118 A1    Jan. 8, 2009

(30) Foreign Application Priority Data
Feb. 3, 2006  (DE) .......................... 10 2006 005 382

(51) Int. Cl.
C23C 16/52 (2006.01)
B05D 1/24 (2006.01)
B05D 7/00 (2006.01)
B05C 11/00 (2006.01)

(52) U.S. Cl. ............ 427/8; 427/185; 427/213; 118/665; 118/688

(58) Field of Classification Search .............. 427/8, 182, 427/185, 213; 250/341.2, 339.01, 339.11, 250/341.8; 118/663, 664, 665, 688
See application file for complete search history.

(56) References Cited

U.S. PATENT DOCUMENTS

| | | | |
|---|---|---|---|
| 3,196,827 A | 7/1965 | Wurster et al. | |
| 3,241,520 A | 3/1966 | Wurster et al. | |
| 4,591,324 A | 5/1986 | Kubota | |
| 5,750,996 A * | 5/1998 | Drennen et al. | 250/341.2 |
| 6,037,783 A | 3/2000 | Reich | |
| 6,383,553 B1 * | 5/2002 | Tondar et al. | 427/8 |
| 2004/0057650 A1 * | 3/2004 | Folestad | 385/14 |
| 2006/0237300 A1 * | 10/2006 | Stroder et al. | 204/157.15 |

FOREIGN PATENT DOCUMENTS

| | | |
|---|---|---|
| DE | 3314887 | 10/1983 |
| DE | 19504544 | 8/1996 |
| DE | 19723995 | 12/1998 |
| DE | 10322062 | 12/2004 |
| EP | 0370167 | 7/1989 |
| EP | 0507035 | 10/1992 |
| EP | 1325775 | 7/2003 |
| EP | 1232003 | 9/2004 |
| WO | 9308923 | 5/1993 |
| WO | 9624838 | 8/1996 |
| WO | 9723284 | 7/1997 |
| WO | 9817380 | 4/1998 |
| WO | 9844341 | 10/1998 |
| WO | 0137980 | 5/2001 |
| WO | 2006067546 | 6/2006 |

OTHER PUBLICATIONS

Definition of microwave. (2006). In High Definition: A-Z Guide to Personal Technology. Retrieved from http://www.credoreference.com/entry/hmhighdef/microwave.*
Hauschild et al. "Density Monitoring in Circulating Fluidized Beds using a Microwave Sensor", Sep. 6, 1993, pp. 260-262.

* cited by examiner

*Primary Examiner* — Dah-Wei Yuan
*Assistant Examiner* — Jose Hernandez-Diaz
(74) *Attorney, Agent, or Firm* — Volpe and Koenig, P.C.

(57) ABSTRACT

A process for measuring, monitoring and/or controlling directed product movements of fluidized products in process systems (1) selected from fluidized bed and spouted bed systems during a spraying process for coating and/or granulation, which includes, with the aid of one or more microwave sensor devices (8), injecting microwave radiation without contact into one or more product streams, receiving the microwave radiation reflected by the particles of the particular product stream and, on the basis of the microwave radiation received, forming and transmitting a measurement signal for the characterization of the product stream, the corresponding use of microwave sensor devices (8) and correspondingly equipped apparatus (1).

18 Claims, 6 Drawing Sheets

US 8,187,663 B2

MEASUREMENT, MONITORING AND CONTROL OF DIRECTED PRODUCT MOVEMENTS IN A WURSTER-ARRANGEMENT AND SUITABLE SYSTEMS

BACKGROUND

The invention relates to a method for measuring, monitoring, and/or controlling directed product movements in fluidized bed and spouted bed systems, the use of suitable measuring devices for this purpose, and fluidized bed and spouted bed systems provided with such measuring devices (fluidized bed systems or spouted bed systems).

A widely used application in the pharmaceutical industry, also used in the food, feed, and fine-chemicals industry, relates to the coating of solid particles in the fluidized bed or the spouted bed using suspensions, solutions, powders, or melts. Here, a certain amount of these particles are set in motion by a stream of processing gas in a fluidized bed or spouted bed arrangement (in the following also called processing arrangement) and fluidized or entrained with the gas flow, with the gas used preferably being air, however perhaps also nitrogen or other suitable gases or gaseous mixtures. The processing chamber is limited at the bottom, inside the processing arrangement, by one or more influx floors, which are embodied as gas distributors and allow distributing the processing gas flow evenly and/or divided into different zones. Such influx floors (for example embodied as sieve trays) prevent by their construction that any particles fall through into the influx area of the processing gas. In the area of this influx floor one or more spray nozzles are localized, by which the particles are sprayed with the spray medium and granulated or preferably coated, generally called "bottom-spray" processes. Such spray nozzles are commercially available in different embodiments and are used particularly as single and/or preferably two or three-component nozzles. In order to yield particularly even coatings on the particles, the particles are sprayed in a direct current and almost entirely dry during the fluidization and/or hovering phase. In order to separate particles, fluidized by the spray nozzle, from the falling, drying particles certain installations and/or guidance devices are installed in the processing chamber. Such installations are described, for example, by Dale E. Wurster et. al. (U.S. Pat. No. 3,196,827 and U.S. Pat. No. 3,241,520). The quality of the product can be further improved by additional installations in the processing chamber. For this purpose, EP 0570546 describes a way to shield the spray nozzle in order to bring into contact the particles to be sprayed only in the area of a well developed spray jet. By this improvement, additionally a higher spray rate can be achieved. For heavier and particularly sensitive particles, for example tablets, installations have been developed according to EP 1 232 003 to protect the product. This way, the product flow is better controlled and the product is protected from wear and mechanical stress. Several appropriate installations allow multi-chamber or continuous systems, such as e.g., shown in U.S. Pat. No. 3,241,520. All above-mentioned installations operate according to the so-called "Wurster principle".

Even in spouted bed systems operating according to the "bottom-spray" principle (which may also be embodied single or multi-leveled) appropriate product flows and installations can be found, cf. DE 103 22 062 A1 and EP 1 325 775. Here, too, spraying via nozzles occurs in the direction of the primary product flow, which is directed against gravity. The direct current method and/or the direct current principle can be implemented according to the Wurster principle and also according to the spouted bed principles.

In all the processing systems operating according to the Wurster principle today, usually the so-called Wurster pipes are used, standpipes preferably cylindrical in their cross-section, with their distance from the influx floor being variable and which can be ideally adjusted from the outside. The advantage of this coating process according to the direct current principle is a particularly even and homogenous application of the coating material onto the particles provided.

Alternative or in addition to the spray nozzle arrangement according to the bottom-spray method, the spray nozzles may also be mounted laterally at the processing chamber of the fluidized bed or spouted bed system, or also be mounted to certain installations in the fluidized bed or spouted bed system, where here they can spray approximately perpendicular in reference to the product flow and/or preferably here also in the direction thereof. Appropriate conditions are found in spouted bed systems.

The spray rate by which the coating material is applied onto the particles to be coated can either he kept constant over the entire processing progression or adjusted during the progression of the process as well. In this context it is important that the particles are distributed as evenly as possible and are guided through the spray jet at a rate as constant as possible. When in a predetermined, constant spray rate more particles are guided through the spray jet many particles are not or insufficiently sprayed when passing through the spray jet and may be damaged by abrasion or other mechanical stress. This may result in particle breakage and flaking of already applied layers of coating. When at a given spray rate less particles are guided through the spray jet, excess spray droplets cannot be caught by particles. The droplets dry in the processing gas flow and precipitate in the form of fine dust. Additionally, the excess droplets can adhere at the edge regions of the standpipe and form coatings, here. Such coatings hinder an even fluidization and/or formation of spouted beds (more generalized: an even product flow) and can lead to a bad coating result. Fine dust, in turn, can interfere with the formation of a smooth, even surface of the coated particles. For a reproducible and even coating process it is therefore an important condition to ensure a constant product flow (for example in a standpipe of a fluidized bed systems according to the Wurster principle). When the product flow stops by clogging in the product area or in the area of the spray nozzle the quality of the product can be seriously compromised. Particularly when bigger processing arrangements are used having several standpipes or corresponding installations clogging or irregularities are frequently not recognized early enough to allow an intervention.

Using suitable adjustments of the processing conditions and processing parameters, the bottom-spray method (or suitable methods with lateral nozzles) can also be used for the granulation of particles. Here, similar difficulties are found as in the previous paragraph. Both here and there an appropriately good quality of the fluidization must be ensured in order to avoid these problems and processing risks.

In granulation and coating processes the term particle includes all individual materials or objects that can be fluidized in a fluidized bed or a spouted bed systems (preferred variants are defined in the following), which can be granulated in fluidized bed systems or can be coated.

In prior art the quality of the fluidization in the fluidized bed or the spouted bed can be assessed by view panels mounted in the coating chamber, by camera systems, or by the measuring of the pressure difference at the influx floor (e.g., a sieve tray).

View panels are disadvantageous in that they allow an observation of the movement of the particles flowing back from the outside only. The observation by view panels is only possible by using strong light sources, which may result in thermal stress on the product particles, depending on the product. An observation by camera systems requires, due to the high particle speed, a sufficiently quick camera system to render the movements of the fluidized particles distinguishable. Similar to view panels, camera systems need a light source. Camera lenses can be contaminated and clouded by dusting. The view is then only possible to a limited extent. Only expensive rinsing systems with rinsing gas, such as pressurized air, can reduce the formation of coatings. All of the above-described optic ways of control allow only an unsatisfactory qualitative detection of the fluidization behavior (in which particularly the level of fluidization, the concentration of the material flow, and the speed of the material flow are included) of particles in the standpipe. A quantitative statement concerning the fluidization behavior is not possible in this way.

The measuring of the pressure difference is largely dependent on the air distribution and the flow resistance of the influx floor. Particularly in coating processes with more than one standpipe the measuring of the pressure difference only allows statements to a limited extent.

In order to recognize the above-mentioned problems and processing risks and to monitor as well as intervene in a controlling fashion, if necessary, the direct measurement of the product flow in the standpipe is required. A direct measurement is possible by capacitive measuring methods or by measuring the electric resistance in the standpipe. These methods are largely influenced by product humidity or material characteristics, though. Frequently, the di-electricity constant of the product also changes during the coating process such that the capacitative measurements occur under changing conditions. Additionally, the difference of the capacity changes in a filled standpipe is very little compared to an unfilled standpipe, even under ideal conditions. A reliable measurement or assessment of the signals is impossible. Interfering signals, for example by the influence of measurement lines, limit the application of this method even further. In the measurement of the electric resistance dusting or contamination occurring during the process can lead to faulty measurements at the measuring electrodes. The resistance measurement can also be interfered with by purified and deionized water, e.g., used in the production of pharmaceuticals.

From WO 98/44341 A1 a method is known to monitor and/or control and regulate a granulation, agglomeration, instantization, coating, and dehydration process in a fluidized bed or a mobilized pouring by determining the product moisture as well as the ventilation apparatus for performing such methods. The dampening of high-frequency waves of less than 100 MHz or microwaves through moisture present in a fluidized bed is determined by a sensor (embodied as a planar sensor), installed in the external wall of an appropriate fluidized bed system and ending appropriately flush to its interior side, being the moisture sensor. The measuring signal is essentially described depending only on the moisture level and the product temperature. The relevant resonance frequency is described for the entire fluidized bed, not in reference to any individual particles. Electronic measuring signals and product moisture measured are correlated for calibration "off-line".

In WO 98/44341 A1 the overall product moisture level is measured—the fluidization must still be determined by other methods, such as the above-mentioned ones, with all their potential shortcomings.

In DE 195 045 44, the charging with and the speed of carbon dust through pipes for controlling the firing in a boiler is described (primarily via adjusting the amount of supply air for the combustion) in a coal-fired power plant, using microwaves. The ability to use microwave technology for conditions of variable moisture content during spraying is not obvious or described. Here, the purpose is the regulation of a downstream arranged combustion, not the regulation within the chamber of the microwave measuring.

SUMMARY

In light of this background, the object is to provide new methods and devices to allow measuring, monitoring, or controlling directed product movements in fluidized bed or spouted bed systems which can avoid the mentioned disadvantages of other above-mentioned measuring technologies and which allow a direct measuring of the fluidization behavior in quantity and/or quality and a direct qualitative and/or quantitative detection of interruptions of product flow during spray coating and/or granulation processes in the fluidized bed or spouted bed and/or allow or at least facilitate adjusting, monitoring, and controlling and/or scaling up or down a given fluidized bed or spouted bed system to dimensions different from the given arrangement.

The present invention allows solving the problems described and, for the first time, also the direct measurement, monitoring, and/or control of the fluidized behavior, both with regard to quality and quantity. In coating arrangements having several installations, such as standpipes (=Wurster pipes), for the first time additionally a separate measurement and determination and/or a monitoring of the fluidization can occur for each respective section, e.g., for each individual standpipe.

Instead of a standpipe, any differently embodied processing chamber of a fluidized bed system can also be provided with this measuring method, if the product flow is provided in this area with a directed movement having a predetermined direction of motion. Qualitative and quantitative statements concerning the processing progression and the control and regulating tasks are then also possible inside these processing chambers according to the invention. Variants with for example horizontally circulating product flows are described in the following.

For this purpose, the invention relates in a first embodiment to a method for measuring, monitoring, and/or controlling (particularly monitoring and/or controlling) directed product movements of fluidized products in processing arrangements selected from fluidized bed and spouted bed systems during a spraying process for coating and/or granulating, characterized in that it comprises the use of one or more microwave sensor devices emitting non-contacting microwave radiation to one or more product flows, the microwave radiation reflected is received by the particles or the respective particle flow (=of the respective product movement) and based on the microwave radiation received a measuring signal is formed and displayed to characterize the product flow. Here, preferably the coupling of the microwave radiation is performed in the external area of the respective product flow, particularly in the area of one or more guidance devices. Here, the external area particularly relates to an area each directly adjacent to the external edge of the product flow, primarily an area inside a wall of the processing chamber or particularly a guiding device.

In a preferred embodiment of the invention the microwave sensor device or devices are provided with transmitting and receiving units for microwaves, particularly one transmitting and receiving unit combined per measuring site, which allows a particularly simple installation and a good adjustment. The coupling of microwave radiation can be performed directly from the transmitting unit (if necessary covered appropriately) in the desired measuring range (=at a site where the material flow to be measured is located, preferably in the area of the external edge thereof); for this purpose preferably several or particularly one hollow conductor (in particular tubular, e.g., in the form of almost or actually round or polygonal tubes) per transmitting unit, which may comprise conductors common for this purpose, particularly metals or alloys, with their (proximal) end each being provided with several or preferably one transmitting and receiving unit (microwave sensor device(s)), while the other end (distal, located at the side of the product flow to be measured) being closed by a cover sufficiently permeable for microwave radiation, for example a plastic material. This allows the prevention of the influx of material from the product flow and thus measurement in a non-contact fashion (which represents primarily "without removing any material from the product flow and only via the interaction of electromagnetic waves with the measuring material, while particularly any contact with the external parts of the microwave sensor device cannot be excluded).

In particular, commercial devices can be used as microwave sensor devices, which particularly include at least one transmitting and one receiving unit for microwave radiation and, if desired, simultaneously a processing electronic, such as described in U.S. Pat. No. 6,037,783 or EP 0 808 454. A model used for the examples shown in the following is the sensor SolidFlow® from SWR engineering Messtechnik GmbH, D-79424 Auggen, Germany, for example, with the appropriate processing electronic FME. An adjustment to the fluidized bed or spouted bed system can be achieved by appropriately sizing the hollow conductor, for example.

Preferably the coupling of the microwave radiation in the product flow to be examined is performed perpendicularly or approximately perpendicularly in reference to the primary direction of the product flow; however it may also be performed at any other angle.

In particular the coupling of microwave radiation occurs in the area of one or more guiding devices (guiding installations) provided inside the external wall of the vessel of the fluidized bed or spouted bed system, which (by guiding the corresponding processing gas flow) support the directed product flow (i.e. not via the external wall but via additional guiding devices located inside the external wall and/or particularly their walls or sections of their walls, which are not parts of the external wall), with preferably coupling occurs via one or more hollow conductors and the distal end or ends of the hollow conductor or conductors of one or more microwave sensor devices are mounted particularly such that they penetrate a wall (as mentioned preferably inside, i.e. particularly depending on the external wall of the device and/or the coating container arranged inside thereof) of one or more guidance devices (i.e., here respective recesses are provided, such as holes or oblong holes, which are provided preferably with cover devices arranged around the hollow conductor, in order to sufficiently seal the area of the wall not filled by the hollow conductor from the influx of processing gas and particles and thus allow an undisturbed product flow) and its distal end, preferably approximately flush with the surface of the wall respectively facing the product flow (thus, without considerably protruding into the space provided for the product flow, which allows a particularly undisturbed measurement), facing the product flow, while the proximal end is provided preferably on the side of the wall(s) of the conducting device(s) not facing the product flow, preferably also located outside the external wall of the device so that in the latter case the transmitting and receiving unit is also provided outside the external wall of the fluidized bed or spouted bed system. Preferably, one hollow conductor can be provided for each microwave sensor device, however exemplary embodiments are also included in the invention in which one microwave sensor device alternating supplies two or more hollow conductors with microwave radiation and can receive the reflected microwave radiation, for example with the help of a multiplexer device, which allows an alternating and separate addressing of one or more hollow conductors.

Preferably the method according to the invention is performed in such fluidized bed or spouted bed system in which the product flow to be measured, monitored, and/or controlled flows opposite gravity, thus essentially upward, particularly in fluidized bed system having one or more Wurster pipes or further in spouted bed systems having one or more guiding devices, each of which having in the lower section a spray direction opposite the effects of gravity (i.e. particularly essentially upward) or further laterally provided with one or preferably several, such as two or three-component nozzles having a direction of spray perpendicular and/or preferably parallel to the product flow for spraying liquids to coat and/or granulate particles forming the product flow. Particularly preferred is the application of the method for measuring, monitoring, and/or controlling the product flow aligned essentially upward in bottom-spray methods (i.e. at the location the spray nozzle(s) are provided in the influx floors and essentially spray upwards). Particularly preferred are processing devices, particularly here a Wurster device with one or more Wurster pipes as guiding devices. In other sections of the product flow or flows to be measured, for example outside the Wurster pipe or in a different area spaced apart from the guiding device, an opposite product flow can occur (from falling product particles, previously coated and/or granulated by spraying, which for example can be added to the product flow near the bottom and thus ultimately execute a circulative motion.)

A particularly preferred embodiment of the invention relates to a method according to the invention in which the product flow is measured, monitored, and/or controlled inside one or more Wurster pipes of a fluidized bed system, operating according to the Wurster principle (in the following also called Wurster system).

Alternatively, (at least essentially) a horizontally circulating product flow, rotating around a vertical axis of the processing arrangement, may also be subjected to the method according to the invention. The circulation may for example be incited and maintained by at least one appropriately embodied influx floor, for example by appropriately formed slots or openings which give the processing gas, at least sometimes, a motion component parallel to the floor, such as in Conidur plates, Gill plates, or influx floors with overlapping segments or parts, allowing an appropriately directed supply of processing gas between the gaps. Examples are found in EP 0 507 035, WO 97/23284, EP 0 370 167, WO 98/17380, or particularly DE 331 48 87, and U.S. Pat. No. 4,591,324, which are incorporated herein by way of reference. An appropriate processing arrangement and/or an appropriate method according to the invention is provided, in addition to at least one influx floor, with at least one lateral outlet (that can be opened and closed at the appropriate time). Hereby product that needs no further processing can be removed laterally due to the centrifugal forces of the circular motion. Preferably such a method according to the invention includes that the removal (in particular an automated one) is caused and/or performed and/or ended when certain features of the product flow and/or an appropriately resulting measuring signal of the microwave sensor device appears or is reached, for example automatically.

Product flow represents the flow (in the ideal case largely fluidized) of (=at least essentially) a directed product movement of fluidized products) of material to be coated and/or to be granulated, which is determined by one or more supply processing gas(ses) (and partially also by the spray device of single or multi-component nozzles for coating and/or granulating), with material representing particles produced in a finishing process, and at the end of the process completed semi-finished or finished product, such as pellets, coated pellets, tablets, granulates, capsules, extrudates, crystals, powders, or other particle-shaped materials or appropriately small objects. For example, the size of such product particles may range from micrometers to millimeters, for example from (approximately) 50 µm to (approximately) 25 mm or from (approximately) 200 µm to (approximately) 10 mm. This produces, (in contrast to a real fluidized bed, when guiding devices are omitted) a directed movement of product—for example along a guiding device at one side thereof upward and at the opposite side downward. Here "directed' (=essentially directed) particularly represents that the net flow of the particles has a certain direction (e.g., linearly or circularly), with e.g., partial deviations may also occur due to fluidization, gravitation, and turbulences—the better the motion of individual particles coinciding with the net flow the clearer the measurements yielded by the microwave device, and vice versa the more clearly and constant the measurements the more evenly the product flow.

It is surprising that (different from the expectations based on prior art) the measuring conditions can be easily adjusted such that the moisture influence and/or the influence of the spraying process is low, because particularly the dampening is not (at least not exclusively) processed, but the particle movement is evaluated by the microwave radiation reflected by the particles with regard to frequency and amplitude, preferably both parameters, thus (at least) also considering the change in frequency of reflections by the moving particles caused by the Doppler effect.

Preferably the processing occurs frequency-selective so that it is ensured that only flowing particles are measures and for example stationary precipitations or any disturbing influence of a change in moisture can be suppressed.

In this way, the appropriate microwave sensor device can operate quasi like a particle counter allowing the determination of a measuring signal for the amount of particles flowing per time unit.

In order to forward and/or (entirely or partially) process the measurement signals from the transmitting and receiving unit or units for microwaves and/or the microwave sensor device or devices, preferably processing electronics are used connected thereto (preferably individually allocated to each microwave sensor device), which directly or via additional components, perhaps necessary due to the lack of integration of a digital output, via an analog/digital transformer and/or additional modules, such as resistors for adjusting voltages or the like, cause the formation and forwarding of a measurement signal formed during the progression of the measurement (for example a power or voltage signal) to another processing and/or control unit, for example a suitable programmable calculating device (computer, e.g., PC) which for example allows the display or a tabular or graphic illustration of a measurement signal or its evaluation or the control of the arrangement, for example via the processing electronic.

The measurement and/or production of measurement signals can occur continuously, pulsed, or in intervals, with different measurement terms being possible for the pulses or measurement intervals, for example advantageously in relatively short measurement periods, such as in the range from fractions of seconds to several minutes. This may occur, for example in a constant or also in an appropriately interrupted microwave radiation, via the adjustment of a filtering time or scanning time, for example at a processing electronic, which may range for example from 0.2 to 200 seconds, in a potentially advantageous variant from 1 to 30 seconds.

Within the scope of the present invention, microwaves (particularly radiated ones) represent electromagnetic waves with frequencies ranging from 300 MHz to 300 GHz, for example advantageously from 1 to 100 GHz, e.g., 24,125 GHz±100 MHz.

In another preferred embodiment of the invention the method according to the invention can also be used to transfer data, acquired according to the method in a fluidized bed or spouted bed system having certain dimensions and information, to arrangements with smaller or larger dimensions (up-scaling or down-scaling) preferably in an automatic manner using respective software and hardware.

"In processing devices selected from fluidized bed or spouted bed systems" particularly represents inside the fluidized bed or spouted bed vessel (thus for example not in supply pipelines.)

According to the method of the invention particularly the quality (e.g., with regard to the level of fluidization, size, and/or speed of the respective particles in the product flow) can be determined, in particular without any calibration, particularly the uniformity of the product flow, and/or the quantity (e.g., with regard to the amount and/or the speed of the particles in the product flow) of the fluidized product flow and/or particularly the fluidizing means, compared to target parameters and appropriately readjusted, automatically and/or manually. An uncalibrated measurement already allows statements regarding the quality of the product flow and is particularly preferred for its simplicity. The "quality" or "quantity" relate here particularly not to the product humidity per se, i.e. it is not characterized itself.

The invention also relates to the use of one or more microwave sensor devices, preferably having one transmitting and receiving unit and one hollow conductor each, as in a method described above and in the following.

Another embodiment of the invention relates to devices suitable or particularly installed for carrying out a method according to the invention, in particular the fluidized bed or spouted bed systems implemented with components for the methods mentioned above and in the following. Here preferred are (A) a device to execute the method as described above and in the following, relating to a processing arrangement for coating and/or granulating in the form of a fluidized bed or spouted bed system having one or more spray nozzles (particularly having a spray direction approximately (=directly or approximately) upward and which may be embodied as single or multi-component nozzles) and one or more guidance devices and provided with at least one microwave sensor device, characterized in that at least one wall located inside the processing arrangement (=not being a part of the external wall) of an above-mentioned guidance device is provided with a coupling site facing a predetermined aligned product movement in the form of a product flow for microwave radiation emitted by such a microwave sensor device and at least one coupling site facing a predetermined product flow provided for particles of such a product flow reflecting microwave radiation.

(B) More preferred is here a device particularly according to the above-mentioned paragraph, characterized in that for coupling the microwave radiation emitted by the microwave sensor device or devices at least one hollow conductor for microwaves is provided which inside the processing device passes the wall of a guiding device provided at the distal end with a microwave—permeable cover and that its distal end is provided positioned flush to the surface of the above-mentioned wall facing the predetermined product flow, while the proximal end, to which the microwave sensor device is coupled, is provided at the side of the above-mentioned wall facing away from the predetermined product flow.

(C) Even more preferred particularly due to its clear design is a device according to the above-stated paragraph (B), characterized in that it is provided with two or more above-mentioned guiding devices and includes a microwave sensor device, provided with two or more alternating switched hollow conductors mentioned, with each of them leading to one of the walls of one of the guiding devices located inside the device.

(D) Even more preferred is a device according to the above-mentioned paragraph, characterized in that here a central mechanism for height adjustment is provided, which allows the position of the guidance device to be displaced upwards and downwards, particularly because it has a clear and compact design.

(E) Even more preferred is a device according to paragraph (D), characterized in that the central device for adjusting heights is connected in a fixed manner to the microwave sensor device and the hollow conductors and via these to the walls of the guiding devices such so that a joint height adjustment of all above-mentioned components is possible.

(F) Also more preferred is a device according to paragraph (B), characterized in that one or more guiding devices are provided and each microwave sensor device is provided with a transmitting and a receiving unit for microwave radiation and one microwave sensor device for each one of said hollow conductors. This also allows the separate measurement for each guidance device.

(G) Even more preferred is a device according to paragraph (F), characterized in that here one or more height adjustment mechanisms are provided for one or more guiding devices. This allows e.g., an adjustment of the height of the guiding devices in favor of an improved product flow.

(H) Even more preferred is a device according to paragraph (F) or (G), characterized in that here a central height adjustment mechanism is provided for one or more guiding devices. This allows e.g., a very compact design.

Even more preferred is a device according to one of paragraphs (F) through (H), characterized in that a microwave sensor device with a hollow conductor is provided for each guiding device.

(J) Particularly preferred is a device according to paragraph (I), characterized in that each microwave sensor device is installed, positioned in the area of the central height adjustment mechanism of the guiding device(s), and preferably connected thereto in a fixed manner and therefore it is itself height adjustable including the hollow conductor connected to it and one wall each of the guiding devices. In this way, a simple height adjustment can be achieved via a height adjustment mechanism and without requiring any oblong holes in the wall of the guiding device.

(K) A further preferred embodiment according to one of paragraphs (F) or (G) is characterized in that one or more microwave sensor devices are located outside the external wall of the processing device and are connected to the interior of the device via hollow conductors each, which penetrate the external wall and one respective wall of a guiding device. This allows good accessibility, e.g.

(L) More preferred is a device according to paragraph (K), characterized in that the external wall and/or one wall per guiding device is provided with an appropriate number of oblong holes per guiding device for passing the hollow conductor or conductors through it, and which is sealed in the area of the respectively passing hollow conductor by cover devices.

(M) Very preferred is a device according to one of paragraphs (H) through (L), characterized in that a microwave sensor device with one hollow conductor each is provided for each guiding device so that e.g., each product flow can be measured individually.

(N) Also very preferred is a device according to one of the paragraphs (A) through (M), which is characterized in that it is provided with spray nozzles in the form of one or more single or multi-component nozzles in the area of an influx floor.

(O) Very preferred is a device according to one of the paragraphs (A) through (B) for the bottom-spray-method.

(P) Very preferred is also a device according to one of paragraphs (A) through (O), characterized in that it is provided with one or more guiding devices in the form of one or more Wurster pipes, thus that it refers to a fluidized bed arrangement according to the Wurster principle.

(Q) A device according to one of the paragraphs (A) through (P) is particularly preferred, which has one or more microwave sensor devices and at least one processing electronic, which allows an evaluation of the microwave radiation reflected by the particles of a product flow with regard to frequency and amplitude, preferably frequency-selective.

(R) Particularly preferred is a device according to one of the paragraphs (A) through (Q), characterized in that each microwave sensor device is connected to a processing and/or control unit via a processing electronic and/or via additional components.

The invention also relates to a suitable and/or particularly suitable processing arrangement implemented for the method according to the invention in which at least one limit selected from the external wall, influx floor, and/or located inside the processing arrangement is provided with at least one coupling site facing a predetermined, directed product movement (7) in the form of a product flow for microwave radiation emitted by such a microwave sensor device (8) and at least one coupling site facing the predetermined product flow for microwave radiation reflected by particles of such a product flow (thus, particularly the one or more coupling and decoupling sites are not mandatory positioned in the area of one or more guiding devices inside the processing device but must be inserted in the external wall and/or in the influx floor, but alternatively and/or additionally can be inserted in the influx floor), with except for the position of the coupling and decoupling site otherwise the other features such as implemented in paragraph (A) or one or more of the paragraphs (B) through (Q), with the processing device being preferably embodied for creating an essentially horizontally circulating product flow (particularly via at least one influx floor appropriately embodied according one of the above-described methods for horizontal circulation) and particularly provided with at least one lateral outlet (that can be opened and closed) (for a lateral product removal). Preferably in an appropriate processing device for the coupling of microwaves of the microwave sensor device or devices at least one hollow conductor for microwaves is provided, which penetrates at least one of the limits mentioned, provided at the distal end with a cover that can be penetrated by microwaves, and with its distal end being provided positioned at a side of the limit(s) facing the intended product flow, while the proximal end to which the microwave sensor device(s) is or are coupled is provided at the side of the limit(s) facing away from the intended product flow. Advantageously, such a device can be provided with two or more of the above-mentioned limits and include a microwave sensor device, which has two or more alternating switched hollow conductors, each of which leads to one of the limits located inside the device (processing arrangement). Alternatively, each microwave device is provided with a transmitting and a receiving unit for microwave radiation and each microwave sensor device is provided with one of said hollow conductors. In a particularly preferred manner, the microwave device(s) can be located outside the processing arrangement in the processing arrangements mentioned above in this paragraph and each be connected via hollow conductors, which penetrate the external wall of the processing device, be connected to the interior of the device. Particularly preferred are also the above-mentioned processing arrangements in which the spray nozzles are provided in the form of one or more single or multi-component nozzles in the area of the influx floor, in particular, implemented for bottom-spray methods. Further, in the above-mentioned processing devices at least one processing unit each can be provided, which allows the processing of the microwave radiation reflected by the particles of a product flow with regard to the frequency or the frequency and the amplitude, preferably in a frequency selective manner, particularly considering the frequency changes of the radiation reflected by the particles inside the product flow.

The invention also relates to a method mentioned above and in the following, which uses one of the above-mentioned devices and/or is guided therein.

Preferred embodiments to meet the objects of the invention are also disclosed in the claims, particularly the sub-claims, which are included here by way of reference. Preferred embodiments of the invention also result from replacing one or more general terms or statements by one or more specific or preferred definitions mentioned above and in the following (including in the claims).

BRIEF DESCRIPTION OF THE DRAWINGS (Potentially preferred) examples for the devices and/or methods according to the invention or their measurements are shown:

DETAILED DESCRIPTIONS OF THE PREFERRED EMBODIMENTS

The following examples illustrate the invention without limitations, but they can also represent embodiments for methods according to the invention, devices according to the invention, and utilizations according to the invention:

Example 1

A Device According to the Invention for a Method According to the Invention

Figure 1:
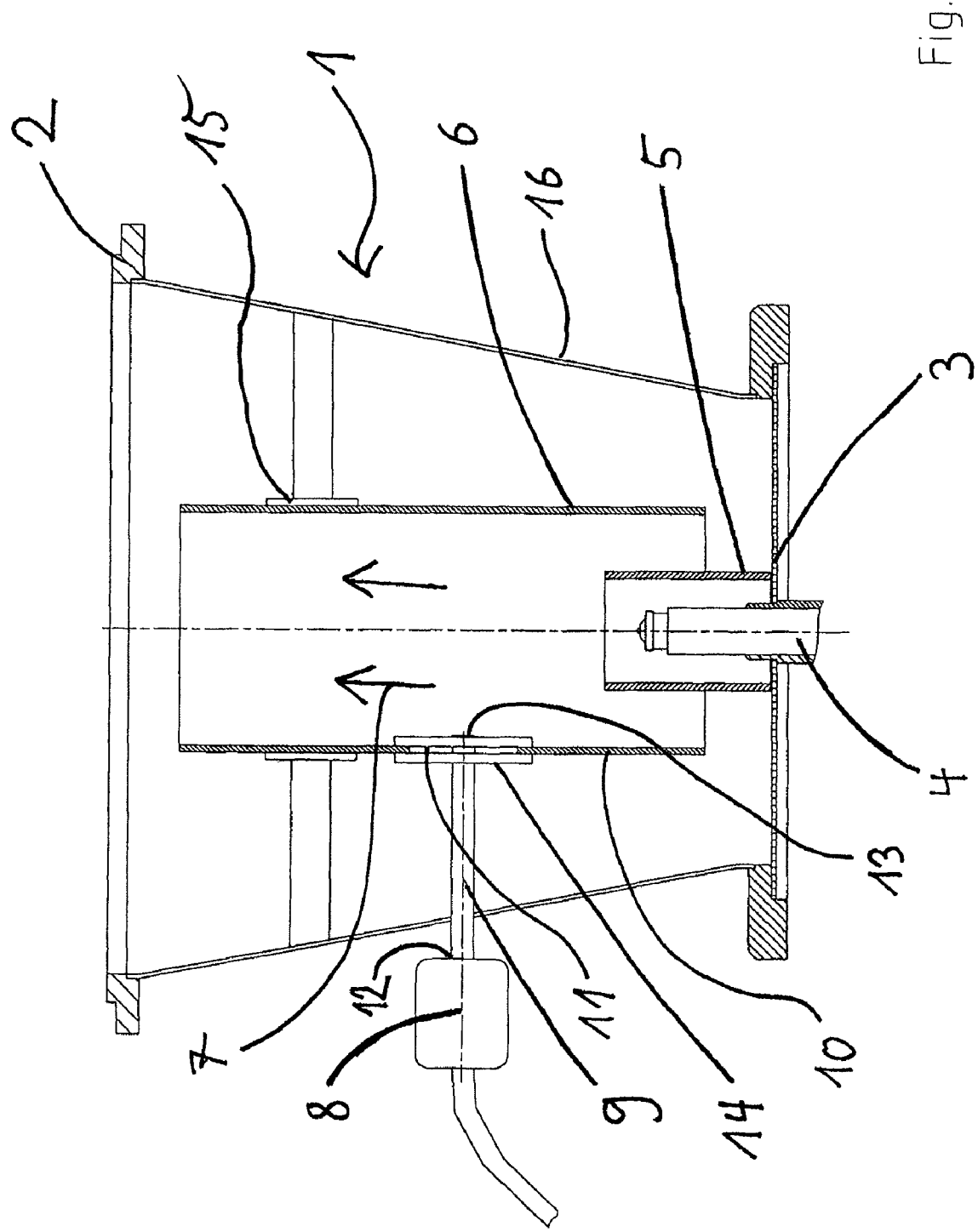
FIG. 1 is a schematic lateral cross-section through an exemplary bottom-spray fluidized bed system with (as an example of a guiding device) a Wurster pipe (i.e. a Wurster system) and an installed microwave sensor device including a hollow conductor.

The design of a potential measurement arrangement for a method according to the invention is described exemplarily in FIG. 1 for a single-pipe Wurster coating process. A processing arrangement 1, here exemplarily shown (preferably) as a fluidized bed system according to the bottom-spray principle (for example it may represent a fluidized bed system of the type GPCG15—Glatt-Powder-Coater-Granulator, Glatt GmbH, Binzen, Germany, which is also used in the subsequent examples), comprises a coating vessel 2. Said vessel is limited towards the bottom by an influx floor 3, here embodied for example (also preferred) as a sieve tray, which simultaneously hinders the product from falling through. A spray nozzle 4 with an optional nozzle collar 5 ensures the application of the coating material to the provided particles which with the help of the processing gas flowing in via the influx floor 3 and the guiding device 6 (here shown exemplarily as a (preferred) standpipe or Wurster pipe) executing a directed product movement 7 (product flow). Microwave radiation is coupled from a microwave sensor device 8 (with (preferably) one each) transmitting and receiving unit for microwaves and a processing electronic, if applicable) directly or preferably via a hollow conductor 9 into the guiding device 6. The upper, the middle, and the lower area of the guiding device 6 have proven suitable positions, with preferably the approximately middle of the guiding device 6 can be used as the optimal position. Preferably but not mandatory (at least) one oblong hole 11 is integrated in the wall 10 of the guiding device 6 located inside the processing arrangement through which a height adjustment of the guiding device 6 is possible in a fixed assembly of the transmitting and receiving unit 8 and, if applicable, the hollow conductor 9 with a proximal end 12 and a distal end 13 (which should be closed with a microwave-permeable material), facing the product flow, (for example when using a Wurster pipe with a diameter of 22.86 cm and a height of 60 cm and a material thickness of 3 mm, as used in the following examples, an oblong hole 11 is provided in an area from 6.5 to 12.5 cm below the upper edge of the Wurster pipe and/or from 23.5 to 29.5 cm below said upper edge). The oblong hole 11 (or the oblong holes, if more than one is given) is covered during operation by a suitable cover device 14 around the area penetrated by the hollow conductor so that no lateral flow through the oblong hole 11 can influence the measurement. The guiding device 6 can here by varied in its distance to the influx floor 3 via a height adjustment mechanism 15 (here, e.g., in the form of fixed arms and an annular area around the Wurster pipe, inside of which the Wurster pipe can be displaced upwards or downwards). The microwave radiation is reflected by the fluidized solid material particles and received by the receiving unit. The processing occurs via processing electronics, integrated in 8 and/or separate, preferably with regard to frequency and amplitude of the reflected signals. Precipitations or particles that are not moving can be suppressed by a frequency-selective processing. This is of an important advantage in that it can be distinguished between a stationary particle bed and a fluidized particle flow. The proximal end 12 of the hollow conductor and thus the microwave sensor device 8 can here by located advantageously outside the external wall 16 of the processing device and thus can be easily accessible so that the hollow conductor penetrates the external wall 16. For this purpose, one or (if measurements shall be taken at different heights, for example) several holes may be provided in the external wall 16 covered by suitable cover devices covering and sealing areas of the external wall 16 around the hollow conductor and not penetrated by the hollow conductors, (for example in a Wurster device GPCG15 at a height of 170 mm, 385 mm, or 555 mm).

Figure 2:
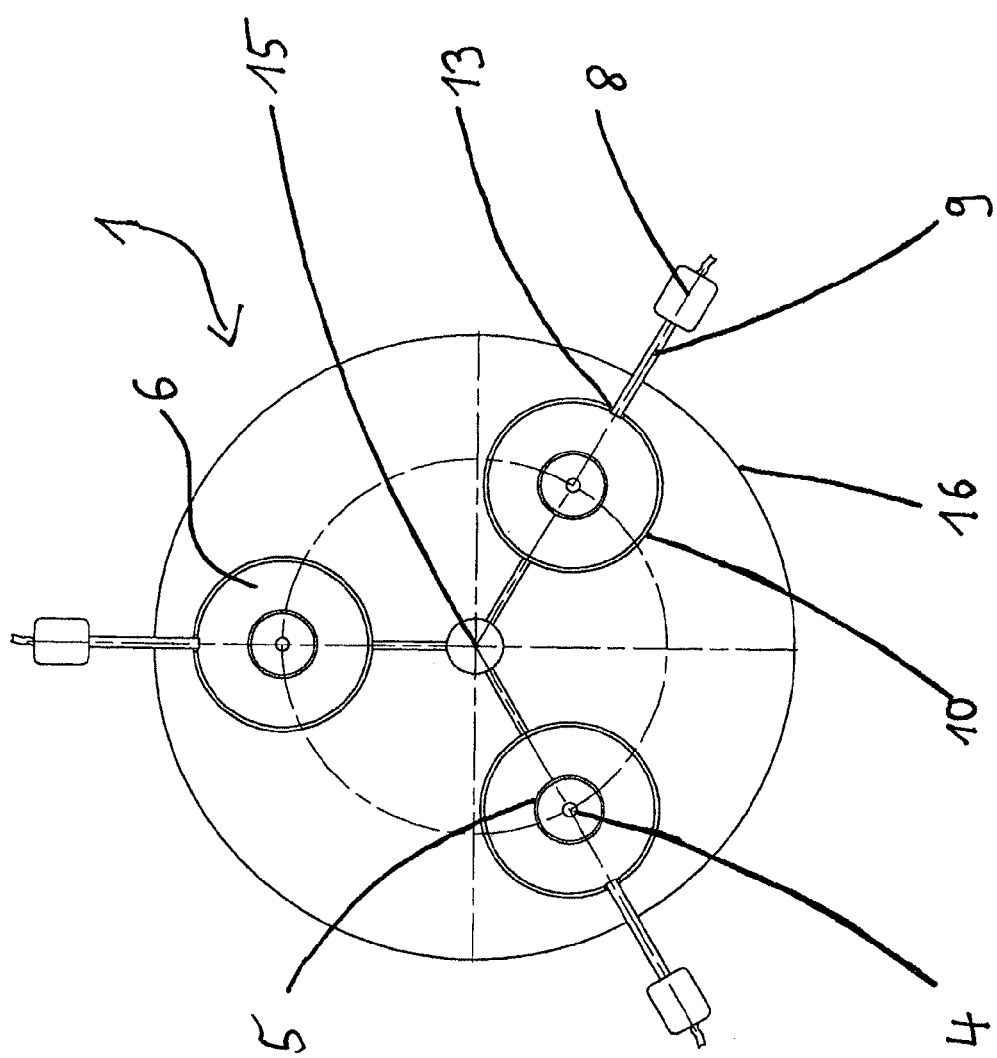
FIG. 2 is a schematic cross-section (from the top) through an exemplary fluidized bed system according to the bottom-spray principle with (as an example for guiding devices) three Wurster pipes and an appropriate number of microwave sensor devices, located outside the fluidized bed vessel and connected via hollow conductors, having a central height adjustment for the Wurster pipes.

For the installation in a processing arrangement 1 having several guiding devices 6, particularly standpipes, microwave sensor devices 8 according to FIG. 2 can be provided positioned at the outside as shown in FIG. 1. Here, particularly a central height adjustment mechanism 15 can be jointly provided for all guiding devices 6, with 9 being the hollow conductor, by which the microwave radiation can be coupled out of and into the transmitting and receiving unit for microwaves of the microwave sensor device 8, which may also include a processing electronic that can be coupled to the interior space of the control devices 6. The spray nozzles 4 are here shown from above.

Figure 3:
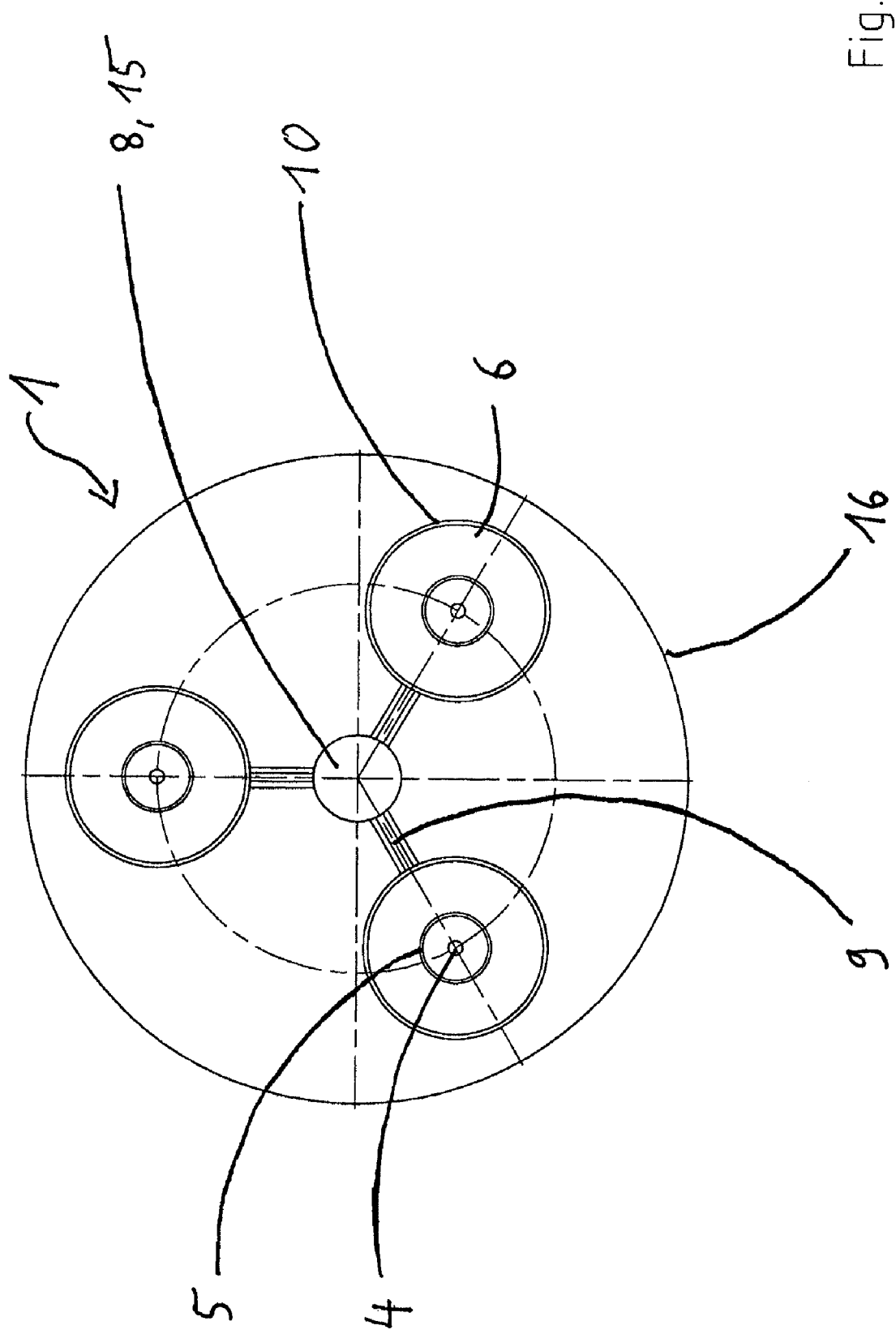
FIG. 3 is a schematic cross-section (from the top) through an exemplary fluidized bed system according to the bottom-spray principle with (as an example for guiding devices) three Wurster pipes and microwave sensor devices located inside the fluidized bed vessel connected to the Wurster pipes via hollow conductors as well as connected to a central height adjustment.

It may also be beneficial and advantageous to arrange the microwave sensor arrangements 8 centrally according to FIG. 3, for example next to and/or above each other in the center of the processing arrangement 1; alternatively it may also be provided that the hollow conductors 9, each individually alternating, can only be switched to a central microwave sensor device with one transmitting and receiving unit each (for example via a multiplexer mechanism, with the switching only engaging one of the hollow conductors 9 coming from a control device 6, so that, using only microwave sensor device 8, still individual measurements can be taken for the individual product flow sections separated by guiding devices 6 (here shown as Wurster pipes). The microwave sensor device(s) 8 and the hollow conductors 9 can here be installed independent from the central height adjustment mechanism 15 (here shown schematically simplified together with the microwave sensor devices 8) or particularly directly connected thereto (in other words, in the latter case separate arms of the height adjustment mechanism are unnecessary because the hollow conductors 9 fulfill this function, while in the first case connecting arms from the central height adjustment mechanism 15 to the guiding devices 6 are necessary) and can lead (2) therefrom individually or as a unit to the guiding devices 6 (here shown a standpipes). In the embodiment with the hollow conductors and the central height adjustment mechanism being connected to each other a seal between the wall 10 of a height adjustable guiding device 6 and the distal end 13 of the hollow conductor 9 can be omitted because no oblong hole 11 needs to be used. When the arms of the height adjustment mechanism 15 and the arms of the hollow conductor 9 or several hollow conductors 9 are separately guided to the individual guiding devices 6, if such an ability for height adjustment is given, each requiring an oblong hole 11 per guiding device 6 beneficially or necessary if the position of the hollow conductor cannot be changed, and otherwise are preferably sealed with a cover device 14, allowing the penetration of the hollow conductor or conductors 9. For each guiding device 6 preferably one microwave sensor device 8 and one hollow conductor 9 is provided, however, an embodiment as described above with only one microwave sensor device is also possible, which performs the measurements alternating between the individual hollow conductors. The measuring signals for the individual guiding devices 6 can individually or jointly be processed and visualized after their forwarding to one or more processing units (for example also integrated in the installation control) preferably via processing electronics already integrated in the microwave sensor devices 8.

Example 2

Calibration

Preferably, a microwave sensor device 8 must first be calibrated for the operation. On the other hand, due to the fact that no absolute values or mass flow is necessary for evaluating the fluidization it may be sufficient to adjust a microwave sensor device, for example, only with regard to its measuring range (i.e. without any calibration), which is another preferred embodiment. For this purpose, a processing device 1, particularly a fluidized bed system according to the bottom-spray principle and/or its coating vessel 2, are filled with a predetermined amount of particles and the arrangement is operated at the desired processing gas speed or speeds for a period of time at a certain setting and the minimal and maximal values occurring here are recorded. The signal output of the microwave sensor device 8 provides raw data values for a downstream processing electronic (if applicable, integrated in the microwave sensor device.) The processing electronic changes the raw signals into measurement signals that can be processed, which then are directly further processed via the processing electronic and/or via a processing and/or control unit which may be integrated to the device control, e.g., calibrated, visualized, saved (for example to collect empirical data for up-scaling or down-scaling) and/or for a control of the arrangement (also automatic, for example). Here, the calibration factors are preferably adjusted such that in a stationary product bed a zero signal and at maximum fluidization (=primarily at least largely optimized product flow of fluidized particles for the respective spray process, depending among other things on the maximum amount of particles entering the product flow per time unit and the particle speed, because i.e. spraying is no longer possible to a sufficient extent when the particle speed is too high (too much supply of processing gas) so that here a maximum useful particle flow and thus a speed of processing gas is to be considered) a measurement signal is yielded different from the zero signal, e.g., in the range of a maximum one (or also one in the range from, for example, 25 to 100% of the maximum signal.) When the fluidization stops or when it is changed in intensity, an also changed measurement signal results at the output of the microwave sensor device such that adjustments of the processing parameters are possible.

Figure 4:
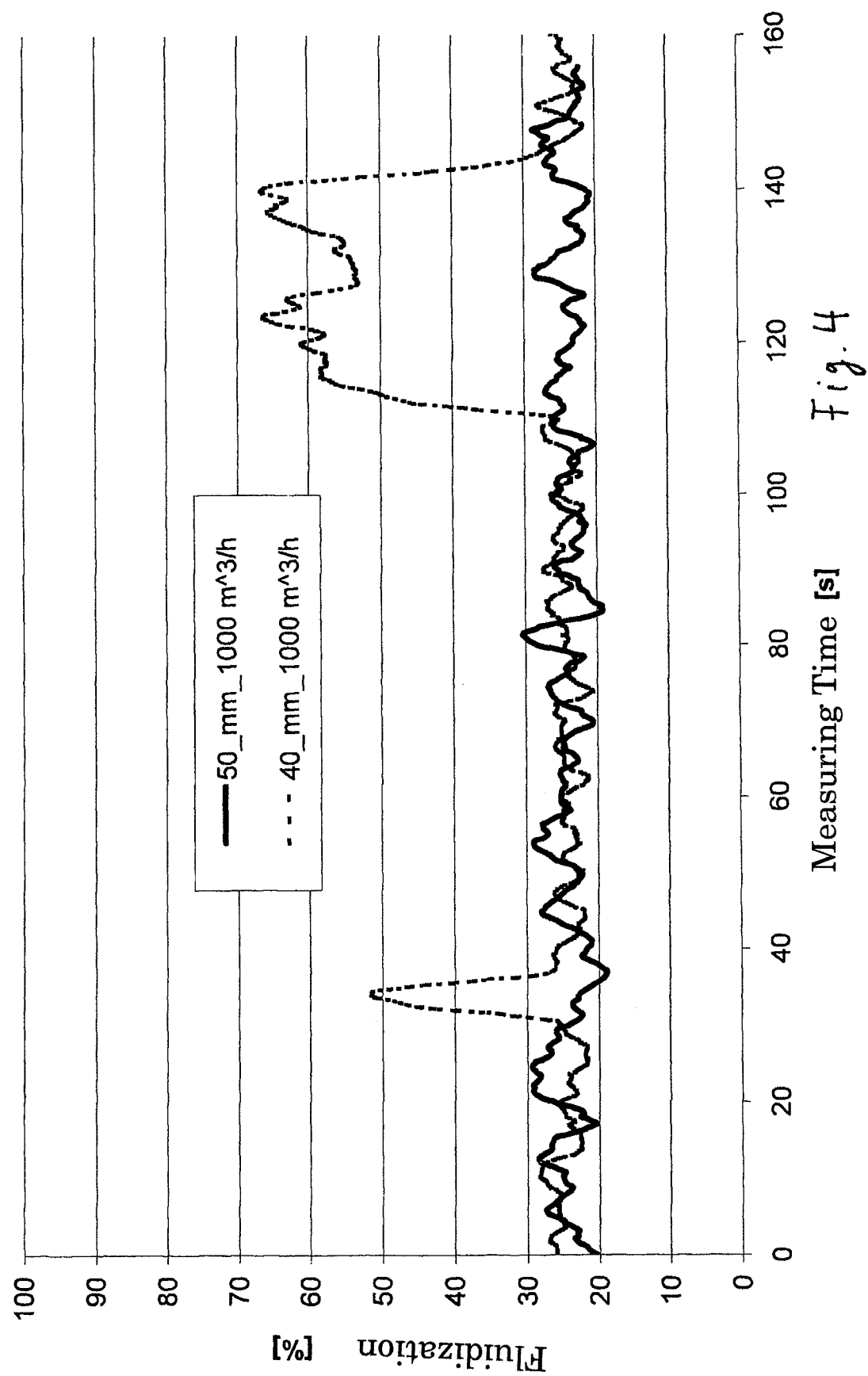
FIG. 4 is a graphic illustration of the measurement data using an example for uneven fluidization at a 40 mm in reference to a 50 mm distance between the influx floor and the Wurster pipe at good fluidization.
Figure 5:
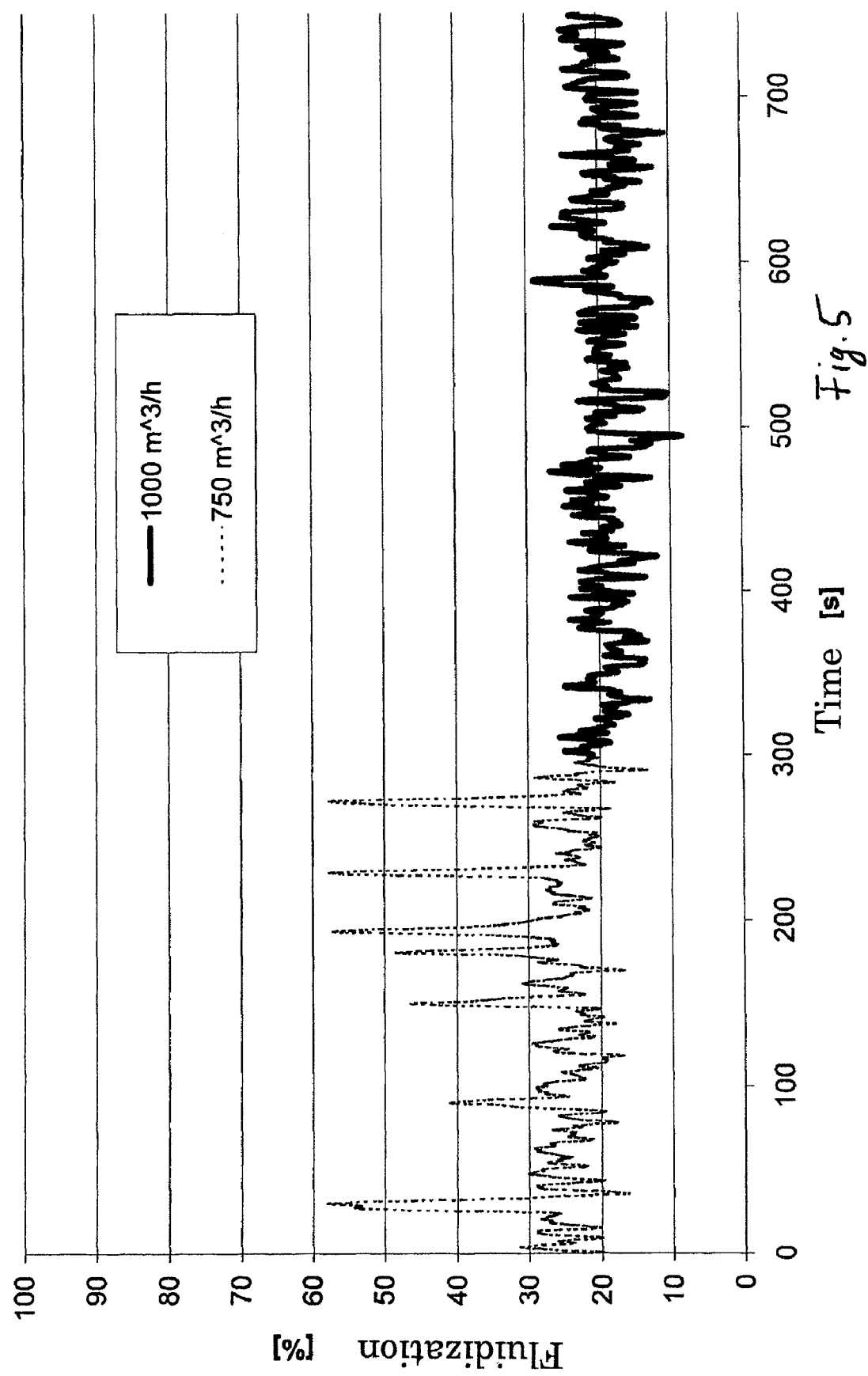
FIG. 5 is a graphic representation of the measurements for an example of the influence of different amounts of processing air on the fluidization behavior in a Wurster pipe.
Figure 6:
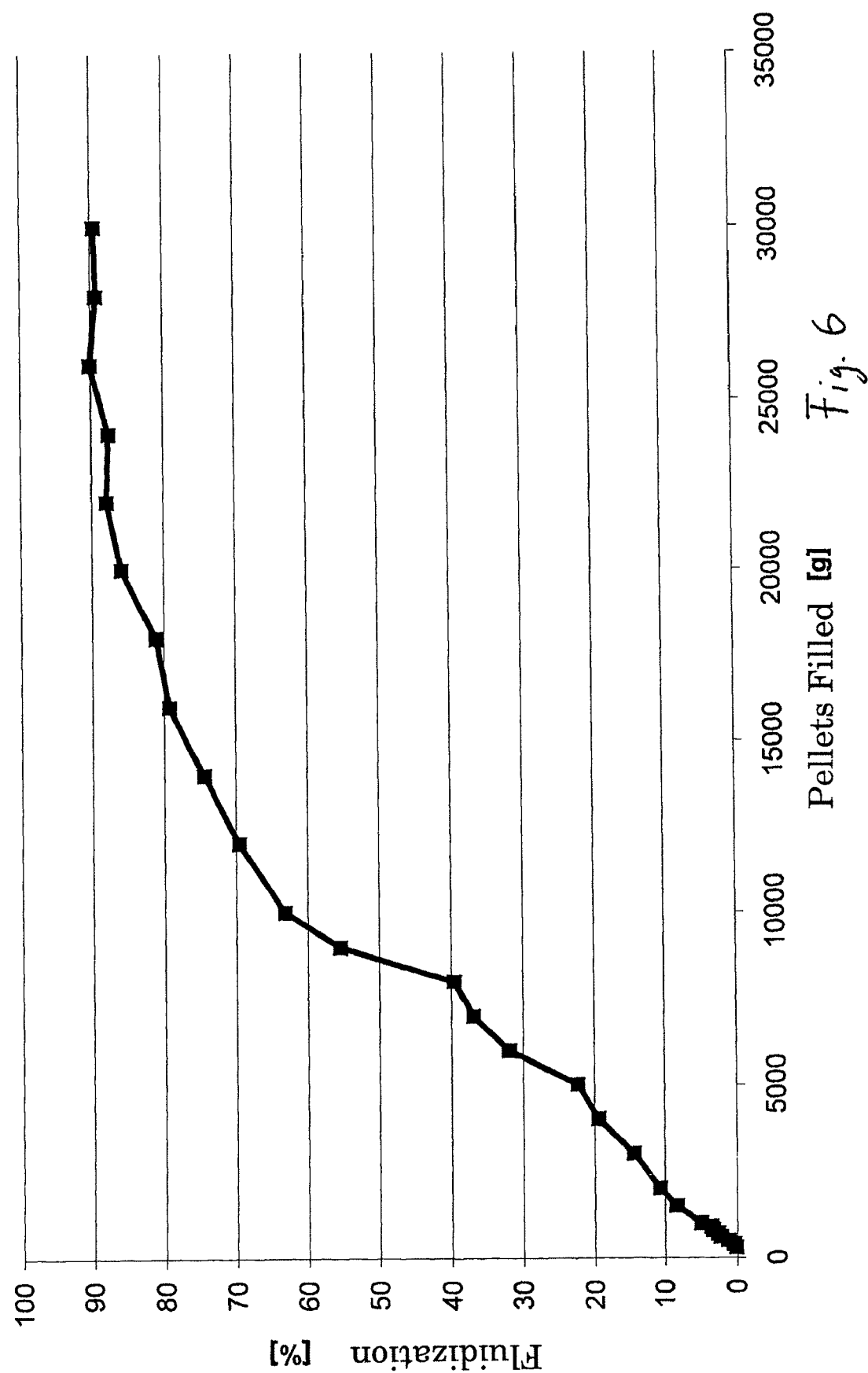
FIG. 6 is an exemplary graphic representation of measurement data for fluidization in a Wurster pipe at different fill amounts of the product container. Determination of the Minimally Necessary Amount of Product.

The following ranges of applications can be covered according to the invention using the microwave sensors, such as for example shown for the method according to the invention, with the exemplary data of a fluidized bed arrangement GPCG15 yielded for FIGS. 4 through 6, as mentioned in example 1, is used connected to a Wurster pipe having a diameter of 22.86 cm and a height of 60 cm and a material thickness of 3 mm and via a respective hollow conductor a microwave sensor device of the type SolidFlow® (as mentioned above, connected via a shunt resistance (470Ω) to a 16 bit analog/digital transformer (AD-USB 4 of Conrad, the other analog inputs grounded via a 1 kΩ-resistor) and a connection adapter to the output of the processing electronic FME of the SolidFlow® to a calculator, with the software "AD-USB Data Monitor" supplied with the transformer being used to record the voltage progression to determine the scanning rate of the transformer and to save the data on the computer and to enter them into Excel, and via a RS485 to the USB interface transformer having the SWR-software "FME-configuration program" read the calibration data of the processing electronic FME and/or determined via the computer and calibration data saved for various products and all settings of the processing electronic can be performed).

Example 3

An Example for a Method According to the Invention to Monitor the Fluidization in the Process A separate microwave sensor device 8 is used for each guiding device 6 (particularly embodied as a Wurster pipe). Each of them provides a measurement during the fluidized bed process. In a constant fluidization of the particles in the area of the product flow the measurement signals are almost identical and comparable for the area of each guiding device 6. In the device control, an average value and the standard deviation of the signals can be calculated for example. Using this average value then the individual measurement of each microwave sensor device 8 can be compared. When the individual values of one or more devices 8 are above or below the average value the process can be interrupted or the device controller can be informed. Additionally, limits can be defined for the average value, and when they are exceeded or fallen short an action can be triggered. Additionally, the standard deviation from the average value can be processed. An inhomogeneous process can be assumed when it exceeds a certain limit. Mentioned as potential disturbances during a fluidized bed process may be the formation of agglomerates, adhesions, or clogging in the area of the spray nozzle or product precipitations in the area of the guiding devices 6. When these problems are detected in due time, the user can interfere in a targeted fashion with countermeasures and thus prevent the destruction or breakdown of the product and therefore also any economic damage. Particularly in critical products tending to stick or clog, this measurement process helps to ensure product quality. Conditional to a precise knowledge of the processing behavior and a risk analysis, the measurement process according to the invention is an important development and can be used within the scope of the PAT (process-analytical technology)-US-FEA-initiative "Guidance for Industry, PAT—A Framework for Innovative Pharmaceutical Development, Manufacturing, and Quality Assurance; Pharmaceutical cGMPs, September 2004".

Example 4

The Determination of a Suitable Position for a Guiding Pipeline Arrangement, here Using the Example of a Standpipe The microwave measurement can be used in guiding devices 6, particularly in a Wurster pipe, and not only production arrangements but also within the scope of labs or in pilot arrangements in order to determine for example the distance between the guiding device 6 (e.g., standpipe) and the influx floor 3 during the ongoing operating of an arrangement. The goal should be to achieve fluidization as evenly as possible at a selected position of the guiding device. The measurement signal is recorded at a desired amount of fluidization air over a certain period of time. When the signal is irregular, as shown for example in FIG. 4, the position of the guiding device 6 is changed to such an extent that an even signal is achieved.

In the example shown in FIG. 4, 30 kg cellulose pellets with a diameter in the range from approximately 850 to approximately 1000 μm are fluidized at an amount of air measuring 1000 m$^3$/h. The signal progression in FIG. 4 for an influx floor-standpipe distance of 40 mm clearly shows periods at which more product particles are transported into the Wurster pipe. The fluidization occurs irregularly, which is unsuitable for any even application of spray. This fluidization process (product flow of fluidized particles) is only discernible through an inspection glass during a constant monitoring of the process. A considerably more homogenous signal develops when the Wurster pipe is adjusted to a distance of 50 mm at otherwise identical test parameters.

For this purpose, when fundamental parameters are still unknown, at the beginning of a new, unknown process, parameters such as suitable distance of the standpipe or suitable amounts of fluidized air can be determined quickly and reliably. Additionally, in particular in processes in which the provided particles grow rapidly and thus change the fluidization features, it can be detected when the amount of processing gas for the fluidization must be increased and/or the distance of the standpipe to the influx floor must be adjusted to improve fluidization over the entire processing period. Using appropriate control algorithms such processes can also be automated in a reproducible fashion.

Example 5

Adjusting the Optimal Amount of Processing Air

Even in a fixed position of a guiding device 6 (particularly the position of a Wurster pipe) the fluidization can vary in the process according to the amount of processing gas. Using the measuring method according to the invention an amount of processing gas can be determined, however, in which the product flow is homogenous in the area of the guiding devices 6 (particularly in the Wurster pipe). Although based on a slight dependence on the speed, the measurement fails to allow a direct quantitative conclusion on the amount of particles transported in the product flow without any separate calibration of the measurement system in different amounts of processing gas, however the method allows reliable conclusions on the homogeneity of the fluidization.

An exemplary test is shown in FIG. 5. Here, 30 kg cellulose pellets having a diameter of approximately 850 to approximately 1000 μm are fluidized at amounts of processing gas of 750 m$^3$/h and 1000 m$^3$/h. Air amounting to 750 m$^3$/h is insufficient to achieve an even fluidization (and/or flow) in the given position of the Wurster pipe necessary for the overall trial. An even fluidization of the provided product results when the amount of air is increased to 1000 m³/h.

Monitoring and perhaps automatically controlling the amount of processing gas is necessary, for example, when products due to stickiness show low fluidity and a higher amount of processing gas is necessary for an even fluidization during the process. Additionally, there are processes in which the fluidized particles are subject to a great change of volume, which may occur when applying large amounts or material. Here, the fluidizing behavior of the product also changes during the process and must be supported. According to the invention the changed fluidizing behavior is detected and, if necessary, a (particularly automatic) regulation of the amount of processing gas can occur.

Example 6

The Determination of the Minimal Fill Amount for Processing Vessels

In another exemplary embodiment the measuring process according to the invention is illustrated for the determination of the minimally permissible amount of product in a processing vessel. Particularly in small-scale fluidized bed processes the arrangement is filled with as little product as possible. This saves costs at the beginning of the process development and also the frequently only small amounts of existing source materials. In spite thereof it is necessary that the product is optimally fluidized in the processing chamber. Therefore, in the area of the guiding device, particularly in the standpipe, sufficient amounts of product must be available in the area of the guiding device for the process. For a later transfer of the process data to the pilot or production scale, ideally an optimal fluidization is calculated in the Wurster pipe and the spray rate of the nozzle is adjusted accordingly. When the fluidization in the standpipe is not comparable in the small-scale or the larger-scale any calculations performed for the scale-up or scale-down process may be flawed. Practically, by using the microwave measuring technology, the minimally permissible fill amount can be determined for a fluidized bed process.

In an exemplary experiment, sugar pellets having a diameter of 850-1000 μm are gradually filled into a 18" Wurster-coating vessel. After each addition of pellets the product is fluidized for two minutes each with an amount of supply air of 1000 m³/h. The distance from the influx floor to the Wurster pipe measures 50 mm. According to FIG. 6, the average value of the measurement signals shows rising the more pellets are provided. The Wurster pipe fills more and more until at a provided amount of 20+ kg pellets a flat-top is reached. For these processing conditions therefore a pellet amount of 20 kg would be a potential amount at which the scale-up or scale-down calculations could be performed reliably.

The invention claimed is:

1. A method for measuring and characterizing a product flow in a fluidized layer processing arrangement (1) that comprises a Wurster-arrangement operating according to a bottom-spray method, and including at least one Wurster tube as a guiding device, the method comprising that during a spraying process for coating or granulating, using one or more microwave sensor devices (8) and emitting microwave radiation to one or more product flows in the at least one Wurster tube, receiving reflected microwave radiation from particles of the respective one or more product flows, and forming and displaying a measuring signal for an amount of particles flowing per unit time based on the received microwave radiation for monitoring and/or controlling the product flow of fluidized product.

2. A method according to claim 1, wherein coupling of the microwave radiation is performed in an external area to the one or more product flows in the at least one Wurster tube.

3. A method according to claim 1, wherein the one or more microwave sensor devices (8) include a combined transmitting and receiving unit for each measuring site.

4. A method according to claim 3, further comprising guiding the microwave radiation via one or more hollow conductors (9) that extend to the at least one Wurster tube.

5. A method according to claim 1, wherein one transmitting and one receiving unit and one hollow conductor (9) are provided for each of the microwave sensor devices (8), and each of the hollow conductors (9) is closed at a distal end (13) by a cover permeable for the microwave radiation.

6. A method according to claim 1, wherein coupling of the microwave radiation into the product flow to be examined is performed perpendicularly in reference to a primary direction of the product flow at each measuring site.

7. A method according to claim 2, wherein the coupling is formed via one or more hollow conductors (9) with a distal end or ends (13) of the one or more hollow conductors (9) being arranged such that they each penetrate a wall (10) of one or more guiding devices (6) formed by the at least one Wurster tube, and the distal end or ends (13) are arranged flush, facing the product flow, with a face of the respective wall of the guiding device facing the product flow, while a proximal end (12) is provided at a side of the wall of the guiding device not facing the product flow.

8. A method according to claim 1, further comprising directing the one or more product flows in a measuring area opposite gravity in an essentially upwards direction.

9. A method according to claim 1, further comprising spraying coating material essentially upwards via one or more spray nozzles (4) having a form of single or multi-component nozzles, which are provided in an area of one or more influx floors.

10. A method according to claim 1, wherein the product flow comprises particles having a size ranging from 50 μm to 25 mm.

11. A method according to claim 1, wherein the product flow comprises pellets, coated pellets, tablets, granulates, capsules, extrudates, crystals, powders, or other particular materials.

12. A method according to claim 1, further comprising processing the reflected microwave radiation with regard to frequency and amplitude.

13. A method according to claim 1, further comprising processing the reflected microwave radiation in a frequency selective manner.

14. A method according to claim 1, wherein processing of the measuring signal is performed via processing electronics respectively connected to at least one of the microwave sensor device or devices (8) or a processing or control unit, and directly controlling the device using the measuring signal.

15. A method according to claim 1, wherein the measurement occurs with a filter period or scanning rate from 0.2 to 200 seconds.

16. A method according to claim 1, wherein the radiated microwave radiation has a frequency from 1 to 100 GHz.

17. A method according to claim 1, wherein the radiated microwave radiation has a frequency from 24.125 GHz±100 MHz.

18. A method according to claim 1, further comprising automatically removing product when a certain feature of the product flow or an appropriately resulting measuring signal of the microwave sensor device occurs or is reached by at least one lateral outlet that can be opened and closed.

\* \* \* \* \*